US010626748B2

(12) United States Patent
Chandra et al.

(10) Patent No.: US 10,626,748 B2
(45) Date of Patent: Apr. 21, 2020

(54) SYSTEM AND METHOD FOR PREDICTING AND MANAGING LIFE CONSUMPTION OF GAS TURBINE PARTS

(71) Applicant: General Electric Company, Schenectady, NY (US)

(72) Inventors: Ramu Sharat Chandra, Dublin, CA (US); Achalesh Kumar Pandey, San Ramon, CA (US); David Stephen Muench, Simpsonville, SC (US); Niranjan Gokuldas Pai, Greenville, SC (US)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 14/562,925

(22) Filed: Dec. 8, 2014

(65) Prior Publication Data
US 2016/0160762 A1   Jun. 9, 2016

(51) Int. Cl.
*F01D 21/00* (2006.01)
*F02C 9/28* (2006.01)
*F01D 21/14* (2006.01)

(52) U.S. Cl.
CPC ............ *F01D 21/003* (2013.01); *F01D 21/14* (2013.01); *F02C 9/28* (2013.01); *F05D 2260/81* (2013.01);
(Continued)

(58) Field of Classification Search
CPC .......... F01D 21/003; F01D 21/14; F02C 9/28; F05D 2260/81; F05D 2260/821; F05D 2270/11; G05B 23/0283
See application file for complete search history.

(56) References Cited

U.S. PATENT DOCUMENTS 4,215,412 A     7/1980  Bernier et al.
7,203,554 B2 *  4/2007  Fuller ................. G05B 13/048
                                                            700/121
(Continued)

FOREIGN PATENT DOCUMENTS

WO   WO-2008124327 A2 * 10/2008  ............. F01D 17/00
WO   WO 2013014202 A1 *  1/2013  ......... G05B 23/0283
(Continued)

OTHER PUBLICATIONS

Gallestey E et al.,"Model predictive control and the optimization of power plant load while considering lifetime consumption", IEEE Transactions on Power Systems, vol. 17, No. 1, Feb. 2002, pp. 186-191.
(Continued)

*Primary Examiner* — Jeffrey C Boomer
(74) *Attorney, Agent, or Firm* — Buckley, Maschoff & Talwalkar LLC

(57) ABSTRACT

A method for estimating and managing life of a gas turbine is provided. The method includes estimating a remaining useful life of a component of a gas turbine, obtaining parameters of the gas turbine, at least one of which comprises the estimate of the remaining useful life of a component of the gas turbine, assigning operating weightages to the gas turbine parameters based a plant objective, generating a set point for operating the gas turbine based on the weighted gas turbine parameters, and adjusting an operating characteristic of the gas turbine to meet the set point.

17 Claims, 4 Drawing Sheets

(52) U.S. Cl.
CPC .... *F05D 2260/821* (2013.01); *F05D 2270/11* (2013.01)

(56) References Cited

U.S. PATENT DOCUMENTS

| | | | |
|---|---|---|---|
| 7,219,040 B2 | 5/2007 | Renou et al. | |
| 7,243,042 B2* | 7/2007 | Plotts | G01K 3/04 |
| | | | 374/E3.004 |
| 7,328,128 B2 | 2/2008 | Bonanni et al. | |
| 7,676,285 B2 | 3/2010 | Hoyte et al. | |
| 7,810,385 B1* | 10/2010 | Narcus | G01M 15/14 |
| | | | 73/112.01 |
| 7,925,454 B1* | 4/2011 | Narcus | G01D 21/00 |
| | | | 340/679 |
| 8,116,990 B2 | 2/2012 | Koul | |
| 8,209,839 B1* | 7/2012 | Brostmeyer | F01D 5/005 |
| | | | 29/407.05 |
| 8,437,880 B2 | 5/2013 | Long et al. | |
| 8,509,935 B2 | 8/2013 | Hoyte et al. | |
| 2006/0116847 A1* | 6/2006 | Plotts | G01K 3/04 |
| | | | 702/136 |
| 2006/0228214 A1* | 10/2006 | Mabe | F04D 15/0088 |
| | | | 416/61 |
| 2009/0316748 A1* | 12/2009 | Wawrzonek | G01N 3/18 |
| | | | 374/46 |
| 2011/0037276 A1 | 2/2011 | Hoffmann et al. | |
| 2011/0224959 A1 | 9/2011 | Zhang et al. | |
| 2011/0282500 A1 | 11/2011 | Long et al. | |
| 2011/0296810 A1* | 12/2011 | Hardwicke | G05B 23/0283 |
| | | | 60/39.091 |
| 2012/0029840 A1* | 2/2012 | George | F03D 17/00 |
| | | | 702/34 |
| 2012/0170611 A1* | 7/2012 | Wang | G01J 5/0022 |
| | | | 374/121 |
| 2013/0024179 A1* | 1/2013 | Mazzaro | G06Q 10/04 |
| | | | 703/18 |
| 2013/0332011 A1* | 12/2013 | Ziarno | G05B 23/0213 |
| | | | 701/3 |
| 2014/0058709 A1 | 2/2014 | Machado Viana et al. | |
| 2015/0160098 A1* | 6/2015 | Noda | G05B 23/024 |
| | | | 702/35 |
| 2015/0185716 A1* | 7/2015 | Wichmann | F01K 23/101 |
| | | | 700/287 |
| 2015/0233789 A1* | 8/2015 | Balandier | G01M 15/14 |
| | | | 73/112.01 |
| 2016/0146118 A1* | 5/2016 | Wichmann | F02C 9/50 |
| | | | 701/100 |
| 2016/0147204 A1* | 5/2016 | Wichmann | G05F 1/66 |
| | | | 700/287 |

FOREIGN PATENT DOCUMENTS

| | | | | |
|---|---|---|---|---|
| WO | | 2013191593 A1 | 12/2013 | |
| WO | WO 2013191593 A1 * | | 12/2013 | ............. F01K 13/02 |

OTHER PUBLICATIONS

Mohanty et al., "On-Line Life Prediction of a Structural Hotspot", Structural Health Monitoring/NDE, ASME Digital Library, Oct. 28-30, 2008, 8 Pages.

Li et al., "Damage modeling and life extending control of a boiler-turbine system", American Control Conference Proceedings, Jun. 4-6, 2003, vol. 3., pp. 2317-2322.

* cited by examiner

SYSTEM AND METHOD FOR PREDICTING AND MANAGING LIFE CONSUMPTION OF GAS TURBINE PARTS

BACKGROUND

Embodiments of the present invention relate generally to gas turbines and, more particularly, to predicting and managing gas turbine component life.

Gas turbines are widely used to generate mechanical work for power plants, liquefied natural gas (LNG) plants, and other industrial applications. In such applications, the gas turbine operates as a prime mover, where a fuel (such as natural gas) is burned to produce power. During operation, gas turbine parts are exposed to extremely hot and harsh conditions. For example, gas temperatures in a turbine section routinely cause oxidation and deformation (commonly known as creep) of both rotating and stationary components in the turbine section. Moreover, the rotating parts of the turbine section must continuously withstand large centrifugal loads, while being subjected to thermal stresses. Such high temperatures, centrifugal loads, and thermal stresses may lead to various failure modes of the gas turbine such as fatigue (causing crack initiation and propagation), oxidation (forming of metal oxides which degrade the structural integrity of the gas turbine parts), thermal barrier coating spallation, and creep (permanent plastic deformation which can lead to cracking, dimensional changes, or rubs between static and rotating hardware). Such failure modes may lead to degraded power output, or in more severe instances, liberation of internal parts, which in turn can lead to unplanned outages and equipment damage.

Therefore, gas turbines are typically inspected at predefined intervals of time to identify any damage that the gas turbine components may have sustained. For some types of component inspections, the gas turbines are required to be shut down. This may result in revenue losses and undesirable downtime, especially when such inspections are performed during high power demand periods. Moreover, it may be desirable in some cases to operate the gas turbine at higher capacity than nominal, to generate higher revenues. However, such operations need to be performed carefully and without undue impact on downtime.

It would be desirable to have an improved operating method and maintenance scheduling system which can allow for adjustments in the operation of a turbine.

BRIEF DESCRIPTION

Briefly, in accordance with one embodiment, a method for estimating and managing life of a gas turbine is provided. The method includes estimating a remaining useful life of a component of a gas turbine, obtaining parameters of the gas turbine, at least one of which comprises the estimate of the remaining useful life of a component of the gas turbine, assigning operating weightages to the gas turbine parameters based a plant objective, generating a set point for operating the gas turbine based on the weighted gas turbine parameters, and adjusting an operating characteristic of the gas turbine to meet the set point.

In another embodiment, a method for estimating and managing life of a gas turbine is provided. The method includes determining an operating criterion of a gas turbine, computing a cumulative damage from a failure mode for a component of the gas turbine using the operating criterion, predicting an estimate of a remaining useful life of the component of the gas turbine using the cumulative damage of the failure mode of the component, assigning operating weightages to gas turbine parameters based on a plant objective, wherein the estimate of the remaining useful life of the component of the gas turbine is one of the gas turbine parameters, generating a set point for operating the gas turbine based on the weighted gas turbine parameters; and adjusting an operating characteristic of the gas turbine to meet the set point.

In yet another embodiment, a system for predicting and managing a remaining useful life of a gas turbine is provided. The system includes a life prediction module for predicting an estimate of a remaining useful life of a component of the gas turbine. The life prediction module further includes a criterion identifier for determining an operating criterion of the component of the gas turbine, a damage identifier for computing a cumulative damage of a failure mode at the component of the gas turbine using the operating criterion, and a prediction unit for predicting an estimate of a remaining useful life of the component of the gas turbine using the cumulative damage of the failure mode at the component. The system also includes a weightage identifier for assigning operating weightages to gas turbine parameters based on a plant objective, an optimizer for generating a set point for operating the gas turbine based on the weighted gas turbine parameters; and a gas turbine controller for adjusting an operating characteristic of the gas turbine to meet the set point.

DRAWINGS

These and other features, aspects, and advantages of the present invention will become better understood when the following detailed description is read, with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function. As used herein, the term "based on" may be defined as "based at least in part on". As used herein, the term "gas turbine component" and the term "component of the gas turbine" are used interchangeably.

Embodiments of the present invention include a system and a method for managing of a gas turbine. In one specific embodiment, a life prediction module is used for predicting an estimate of a remaining useful life of a component of the gas turbine and includes a criterion identifier for determining an operating criterion of the gas turbine component, a damage identifier for computing a cumulative damage of a failure mode of the gas turbine component using the operating criterion, and a prediction unit for predicting an estimate of a remaining useful life of the gas turbine component using the cumulative damage of the failure mode of gas turbine the component. A weightage identifier is used for assigning operating weightages to gas turbine parameters based on a plant objective. An optimizer is used for generating a set point for operating the gas turbine based on the weighted gas turbine parameters. A gas turbine controller is used for adjusting an operating characteristic of the gas turbine to meet the set point.

Figure 1:
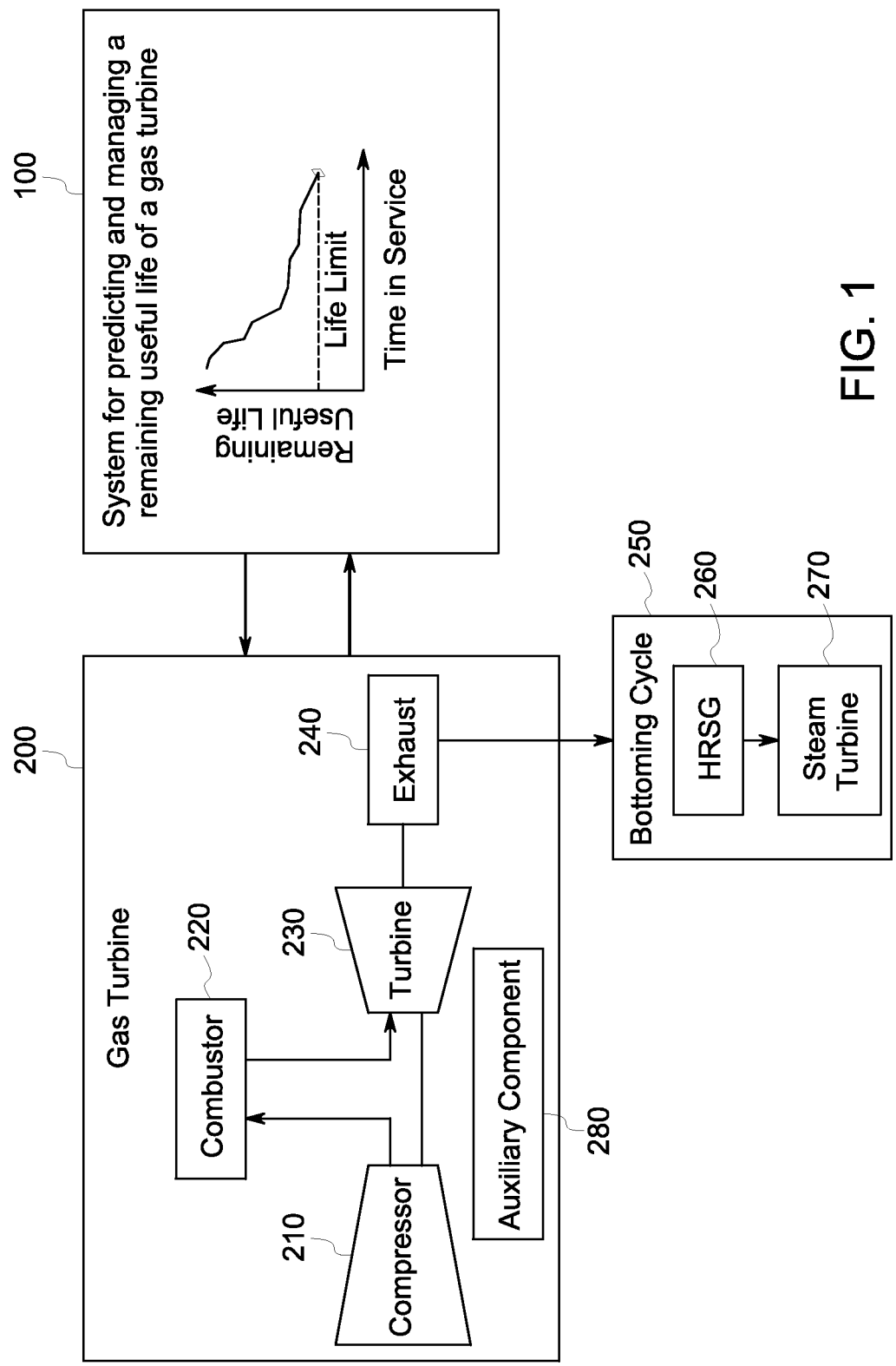
FIG. 1 is a block diagram representation of an industrial power plant including a system for predicting and managing life of a gas turbine in accordance with an embodiment of the invention.

FIG. 1 is a block diagram representation of an industrial power plant 1000 including a system 100 for predicting and managing life of a gas turbine in accordance with an embodiment of the invention. In the embodiment of FIG. 1, the industrial power plant 1000 includes a gas turbine 200 that generates shaft work. To this end, the gas turbine 200 may include a compressor 210, a combustor 220, and a turbine 230 which together convert chemical energy in fuel into mechanical energy in the form of shaft work. The compressor 210 compresses atmospheric air up to a pre-defined pressure which is then mixed with fuel in the combustor 220 to ignite the compressed air. The ignition of the compressed air generates a high-temperature flow in the combustor 220 which further enters the turbine 230 in the gas turbine. The compressed air at high temperature expands in the turbine and generates the shaft work. The shaft work is further used to generate electrical power using electrical generators (not shown). The energy which is not used for generating the shaft work exits the gas turbine via an exhaust system 240 as exhaust gases. In one embodiment, the gas turbine may be coupled to a bottoming cycle 250. In one embodiment, the bottoming cycle 250 may include a waste heat recovery system comprising a heat-recovery steam generator (HRSG) 260 and a steam turbine 270. The bottoming cycle 250 uses the energy of the exhaust gases to generate additional electrical power. The electrical power generated by the gas turbine and bottoming cycle may be used to operate industrial loads present in the industrial power plant 1000 and/or feed a power grid. Furthermore, the gas turbine 200 may also include gas turbine auxiliary components 280 that support the operations of the compressor 210, the combustor 220, the turbine 230, and the exhaust system 240.

The industrial power plant 1000 in the embodiment of FIG. 1 also includes the system 100 for predicting and managing life of the gas turbine 200 which is employed to predict a remaining useful life of a component of the gas turbine 200 using methods described herein. The system 100 manages the remaining useful life of such components by assigning operating weightages to gas turbine parameters based on a plant objective. Examples of gas turbine parameters may include various combinations of remaining useful gas turbine life, power output, efficiency, heat rate, emissions, power ramp rate, startup rate, cost of maintenance, and risk of unplanned outage. In one embodiment, the power output may include an output of the individual gas turbine 200, or a combination of the gas turbine 200 and a bottoming cycle 250. As used herein, the term "gas turbine parameters" may include parameters of an individual gas turbine 200, or a combination of the parameters obtained from the individual gas turbine 200 and the bottoming cycle 250. A plant objective may comprise, for example, a relative priority of one parameter relative to another parameter and may be predetermined, adjusted on line by a gas turbine controller, or adjusted in real time by a gas turbine operator, for example.

As a more specific example, if the plant objective is to enhance efficiency of the plant 1000, the corresponding gas turbine parameter of efficiency will be assigned a higher operating weightage when compared to the parameter of remaining useful life of the gas turbine component. The weighted gas turbine parameters are then used to compute a set point for operating the gas turbine 200. Continuing with the aforementioned example, in order to achieve higher efficiency, the gas turbine 200 may be required to operate at a higher firing temperature. Therefore, the system 100 computes the firing temperature set points for operating the gas turbine 200 at the higher firing temperature which may require adjustments to an operating characteristic of the gas turbine 200. The system 100 further adjusts the operating characteristic of the gas turbine 200 to meet the set point. In one embodiment, the system 100 may also be used to predict and manage life of a waste heat recovery system in a similar manner as discussed above.

Figure 2:
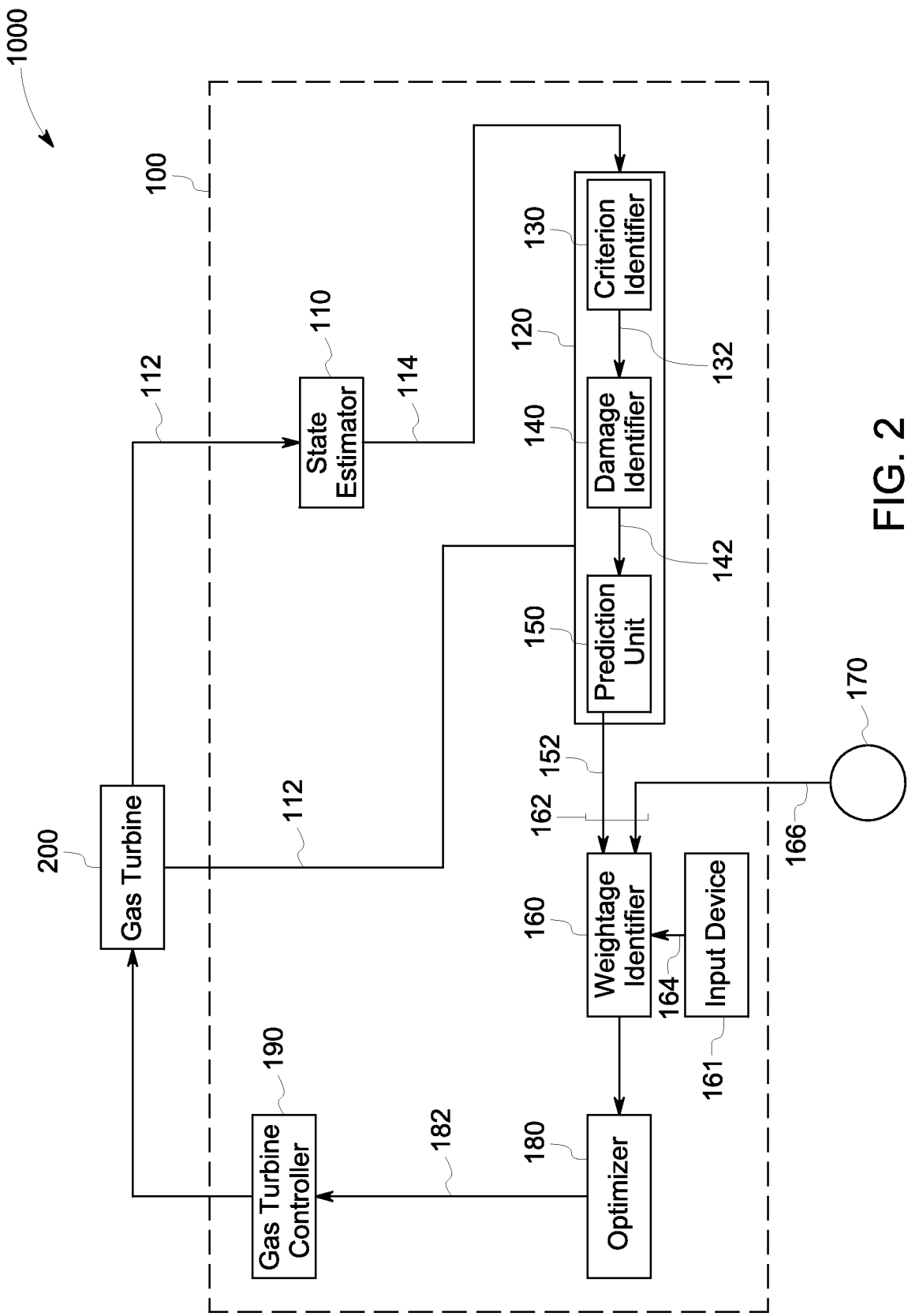
FIG. 2 is a block diagram representation of a system for predicting and managing a remaining useful life of a gas turbine in accordance with an embodiment of the invention.

FIG. 2 is a detailed block diagram representation of the system 100 for predicting and managing the remaining useful life of the gas turbine 200 of FIG. 1 in accordance with an embodiment of the invention. In the embodiment of FIG. 2, the system 100 includes an estimator 110 which is configured to obtain an operating characteristic 112 of the gas turbine 200. The obtained operating characteristic 112 of the gas turbine 200 may be measured using a sensor, for example. The obtained operating characteristic 112 may include, for example, a compressor inlet temperature, a compressor discharge pressure, a compressor discharge temperature, an exhaust temperature, metal surface temperatures, gas turbine power output, fuel flow rate, or combinations thereof.

The estimator then uses the obtained operating characteristic 112 to compute an estimated operating characteristic 114. Typically the estimated operating characteristic 114 is more difficult to measure directly but may be estimated by using another measured value. The estimated operating characteristic 114 may include, for example, a turbine inlet temperature, a firing temperature, a compressor inlet air flow, a cooling flow temperature, a flow rate of the compressed air, or combinations thereof. In one embodiment, the estimator 110 may include a Kalman filter.

In one example, the Kalman Filter uses a mathematical model to compute the estimated operating characteristics. In the Kalman filter, dynamics of the gas turbine may be represented by the discrete time system:

$$x(k+1)=f(x(k),u(k))+w(k),$$

$$z(k)=g(x(k))+v(k)$$

where k is an index representing the time step, f and g are functions representing the system dynamics and output equations, $x(k) \in R^n$ is the state vector for the estimated operating characteristics, $u(k) \in R^m$ is an input vector which is known, $z(k) \in R^p$ is the measurement vector of length p which is computed using the obtained operating characteristics, $w(k) \in R^n$ is a process noise of length n and $v(k) \in R^p$ is a measurement noise of length p, and are used to tune a dynamic performance of the Kalman filter. $w(k) \in R^n$ and $v(k) \in R^p$ are zero-mean Gaussian random variables with covariance $W(k) \in R^{n \times n}$ and $V(k) \in R^{p \times p}$ respectively.

The Kalman filter may recursively predict a conditional Gaussian probability distribution function consisting of conditional mean $\hat{x}(k|k)=E(x(k))$ (where E denotes expected value) and covariance $P(k|k)=E((x(k)-\hat{x}(k|k))(x(k)-\hat{x}(k|k))^T)$. Furthermore, the Kalman filter computes Kalman Gain K(k), which may be represented as:

$$K(k)=P(k|k-1)G(k)^T(G(k)P(k|k-1)G(k)^T+V(k))^{-1}$$

where G represents the Jacobian (i.e., a matrix consisting of partial derivatives) of the output function g(k).

Based on the aforementioned equations, if a system is linear, the Kalman filter may provide statistically optimal results. Therefore, the Kalman filter may use the obtained operating parameters to determine the estimated operating characteristics based on the Kalman gain. Although, functions related to the Kalman filter are explained herein, in some embodiments, other types of filters such as Extended Kalman filter, Unscented Kalman filter or a particle filter may also be used to compute the estimated operating characteristics.

The system 100 further includes a life prediction module 120 for predicting a remaining useful life of a component of the gas turbine 200. The life prediction module 120 receives the obtained operating characteristic 112 as well as the estimated operating characteristic 114 from the gas turbine 200 and the estimator 110. The life prediction module 120 includes a criterion identifier 130 which uses the obtained operating characteristic 112 and the estimated operating characteristic 114 to determine an operating criterion 132 of the gas turbine component. The operating criterion 132 is representative of values indicative of wear on the gas turbine component and may include, for example, stress at a location in the component, strain at the location in the component, temperatures at the location of the component, or combinations thereof. In one embodiment, the location may be identified based an expert knowledge of part designers, distress noted at locations in fielded parts, or a combination thereof.

The life prediction module 120 also includes a damage identifier 140 communicatively coupled to the criterion identifier 130. In one embodiment, the damage identifier 140 may include a damage accumulation model (not shown) that is used to determine damage caused to the component in the gas turbine 200 based on various inputs. The damage accumulation model may include, for example, a physics-based model of the gas turbine 200 and its components which is used to estimate the damage that may be caused to the gas turbine component during operation. The damage identifier 140 may use the operating criterion 132 to determine a cumulative damage 142 of a failure mode at the gas turbine component. As discussed above, failure modes may include fatigue (causing crack initiation and propagation), oxidation (forming of metal oxides which degrade the structural integrity of the gas turbine parts), and creep (permanent plastic deformation which can lead to cracking, dimensional changes, or rubs between static and rotating hardware), for example. In one embodiment, the damage identifier 140 uses values of the operating criterion 132 over time to determine a damage accumulation rate at the gas turbine component. The damage identifier 140 further computes the cumulative damage 142 of the failure mode at the gas turbine component by integrating the damage accumulation rate of the gas turbine component. In a specific embodiment, the failure mode may include creep, fatigue crack initiation, oxidation, creep deflection, thermal barrier coating spallation, fatigue crack growth rate, or a combination thereof.

In one embodiment, if an actual measurement of the damage at the gas turbine component has been obtained during a shutdown of the gas turbine, or using online measurement means, the actual damage measurement may be statistically combined with the cumulative damage 142 of the damage accumulation model, thus adjusting the damage accumulation rate of the gas turbine component to reflect the unique operating profile of the individual turbine. The adjustment to the damage accumulation rate for an individual failure mode may further be used to adjust the cumulative damage 142 of the gas turbine component. In another embodiment, cumulative damage, actual damage measurements, or a combination thereof may also be obtained from the same component of additional gas turbines which are similar to the gas turbine, and then may be statistically combined with the cumulative damage 142, the actual damage measurement, or a combination thereof to adjust the cumulative damage 142 computed for the gas turbine component. For effecting these adjustments of the damage accumulation model, based on a measured damage, a Bayesian technique such as a Kalman filter, Extended Kalman filter, Unscented Kalman Filter, or particle filter can be used.

The life prediction module 120 also includes a prediction unit 150 which is communicatively coupled to the damage identifier 140. The prediction unit 150 receives the cumulative damage 142 of the gas turbine component and predicts an estimate 152 of a remaining useful life of the gas turbine component. In one embodiment, the estimates 152 of the remaining useful life of a plurality of gas components of the gas turbine may be computed separately and may further be collated together based on a predefined correlation between the plurality of components to determine a remaining useful life of the gas turbine 200. In addition to using the cumulative damage 142, the prediction unit may use an estimated operating profile of the component and a design limit of the component to predict the estimate 152 of the remaining useful life of the component of the gas turbine 200. In one embodiment, the estimate 152 of the remaining useful life of the component may include an estimate 152 of the remaining useful life of at least one of a gas turbine compressor part, a gas turbine combustor part, a gas turbine hot gas path part, a turbine part such as a rotor, a bottoming cycle part such as a heat recovery steam generator, and a gas turbine auxiliary component.

In one such example, the remaining useful life of the gas turbine 200 may be estimated for the gas turbine hot gas path part based on the estimated operating profile and the design limit of the gas turbine hot gas path part. To this end, a historical variation of ambient temperature $T_{amb}(t)$ and power output Power(t) are obtained for the gas turbine 200. Such historical data may include hourly data and seasonal data of the ambient temperature $T_{amb}(t)$ and the power output Power(t). The historical data is further used to determine a variation in the ambient temperature and the power output into the future by using average hourly and seasonal trends determined by the historical data. Since, the power output variations do not vary significantly for the same seasons in different time periods, the prediction unit may estimate a future trend of the ambient temperature and the power output of the gas turbine based on the seasons. Such future estimates of the ambient temperature and the power output in combination with other variables such as humidity, electricity prices, fuel prices, and any other variables that may affect economic operation of the gas turbine 200 are used to simulate a mathematical model of the gas turbine 200. The mathematical model is further used to compute the estimated operating profile of gas turbine 200. For example, the estimated operating profile for a particular component may include a specific metal temperature $T_{metal}(t)$ and a stress $\sigma_{metal}(t)$ at a location in the gas turbine hot gas such part in the future. Thus, in general, a dynamic model for such variables as a function of $T_{amb}(t)$ and Power(t) may be represented as:

$$\dot{T}_{metal}(t)=f(T_{metal}(t),\text{Power}(t),T_{amb}(t))$$

$$\dot{\sigma}_{metal}(t)=g(T_{metal}(t),\text{Power}(t),T_{amb}(t))$$

Furthermore, the gas turbine hot gas path part may include sub-components that may have a limitation on life based on a failure mode. The limitation on life is determined during a design process of the sub-component and is generally based on a finite-element analysis (FEA) models. For example, rotating blades in the hot gas path may have a life limitation based on creep. Creep is a failure mode which depends on the metal temperature and the stress in the rotating blades. In one embodiment, creep is further identified as a creep strain for computational purposes. During the design process of the sub-component, a predefined threshold value of creep strain is considered. Any value larger than the predefined threshold value of the creep strain during operation may compromise the structural integrity of the sub-component and may degrade the performance of the sub-component. Therefore, based on the physical properties of the material used to manufacture the sub-component, or a test data, the damage accumulation rate of this failure mode can be represented as $$\dot{\epsilon}_{creep}=f(\epsilon_{creep},T_{metal}(t),\sigma_{metal}(t))$$

Furthermore, an estimated creep at any time into the future can be calculated by integration, in which the creep strain at any given time can be computed. Such integration may be represented as:

$$\epsilon_{creep}(t+dt)-\epsilon_{creep}(t)\approx f(\epsilon_{creep},T_{metal}(t),\sigma_{metal}(t))dt,$$

Therefore, the Remaining Useful Life (RUL) of the sub-component is the delta time into the future at which the creep strain reaches the predefined threshold and may be represented as:

RUL=(time $t$ at which $\epsilon_{creep}$ equals Design Limit)−(Current time)

In one embodiment, the estimate 152 of the remaining useful life of the gas turbine 200 may further be based on at least one of an estimated maintenance cost of the component, an estimated scrap cost of the component, or a combination thereof. For example, the estimate 152 of the remaining useful life may be computed based on the cost of maintenance of the component, which in turn is a function of a damage sustained by the component. In situations, where the cost of the maintenance exceeds a predefined level with respect to replacement cost and a scrap cost, the estimate 152 of the remaining useful life of the component may become near zero. However, if the cost of maintenance does not exceed the predefined level, the component may continue to operate and the estimate 152 of the remaining useful life may be computed accordingly.

In another embodiment, the prediction unit 150 may further compute an estimate of uncertainty in the estimate 152 of the remaining useful life of the component in the gas turbine 200 and may provide such information as part of the estimate 152 to the weightage identifier 160.

The computation of the estimate 152 of the remaining useful life of the component as discussed above may include certain uncertainty parameters. Continuing with the aforementioned example, the metal temperatures $T_{metal}(t)$, and stress $\sigma_{metal}(t)$ may be uncertain due to uncertainties in physical parameters of the physical model used to predict the estimated operating parameters such as the metal temperatures $T_{metal}(t)$, and stress $\sigma_{metal}(t)$. For instance, heat transfer coefficients and material properties may not be known with precision. Furthermore, the computed creep strain rate may have additional uncertain parameters. Therefore, in order to include the uncertain parameters in the computation of the creep strain, the creep strain ($\epsilon_{creep}$) may be represented as:

$$\epsilon_{creep}(t+dt)=h(\epsilon_{creep}(t),T_{metal}(t),\sigma_{metal}(t),\rho),$$

Where h is a function, $\rho \in R^r$ is an r-dimensional vector of random parameters, with mean $\mu$ and covariance $\Sigma$.

Furthermore, integration of the aforementioned stochastic difference equation may be performed using a Monte Carlo method; however, using the Monte-Carlo method may prohibit the computations as the r-dimensional vector of random parameters increases. Therefore, the creep strain can be expressed as a Gaussian random variable, and its mean and variance can be predicted using the Extended Kalman Filter time update equations and may be represented as:

$$\hat{\epsilon}(t+dt)=h(\hat{\epsilon}(t),T_{metal}(t),\sigma_{metal}(t),\mu)$$

$$s(t+dt)=H(t)s(t)H^T(t)+R(t)\Sigma R^T(t) \quad \text{[Time Update]}$$

Where H(t) is the Jacobian of h with respect to the first argument, and R(t) is the Jacobian matrix of h with respect to the last argument $\rho$. These are evaluated at $\epsilon_{creep}(t)$, $T_{metal}(t)$, $\sigma_{metal}(t)$, $\mu$. In another embodiment, an Unscented Kalman Filter with time update may also be used.

In any of the embodiments, a standard deviation s(t) of the creep strain may be computed using the equation:

$$s(t)^2=E((\epsilon_{creep}(t)-\hat{\epsilon}_{creep}(t))^2)$$

The estimate 152 of the remaining useful life of the component may be computed either based on the mean or based on a confidence interval with respect to the mean computed using the standard deviation equation. For example, based on the theory of normal distribution, if −3 s of the remaining useful life denotes a time at which a probability of creep may exceed the design limit of 0.1%, the estimate 152 of the remaining useful life of the component may be computed as:

$$RUL_{-3s}=(\text{time } t \text{ at which } (\hat{\epsilon}_{creep}(t)+3s(t))\text{equals Design Limit})-(\text{Current time}).$$

Therefore, the estimate 152 of the remaining useful life of the component may be computed, which may include the estimate of the uncertainty of the component of the gas turbine 200. Furthermore, the remaining useful life of the component of the gas turbine 200 may be managed using a weightage identifier 160, an optimizer 180, and a gas turbine controller 190 in the system 100. The weightage identifier 160 is communicatively coupled to the life prediction module 120.

The weightage identifier 160 receives a plant objective 164, the estimate 152 of the remaining useful life from prediction unit 150, and other gas turbine parameters 166. In one embodiment, the gas turbine parameter 162 that is in addition to the estimate 152 of the remaining useful life may include power output, efficiency, costs of maintenance of the components, risks of unplanned outage, startup time, emissions, power ramp rate, startup rate, heat rate, or combinations thereof. Some of these parameters may be static values whereas others may be based on or imputed from sensor measurements, for example. In another embodiment, the weightage identifier may receive the estimate 152 of the remaining useful life including the estimate of uncertainty or may receive the estimate 152 of remaining useful life of the component and the estimate of uncertainty separately.

As discussed above, the plant objective may comprise, for example, a relative priority of one parameter relative to another parameter and may be predetermined, adjusted on line by a gas turbine controller, or adjusted in real time by a gas turbine operator. In some situations, it may be beneficial for the plant objective 164 to be a function of the gas turbine parameters 162. For example, if an emissions parameter is not permitted to exceed a certain fixed limit and the emissions are approaching the fixed limit, the weightage for that parameter may need to be increased. The weightage identifier 160 may receive the gas turbine parameters 166 from gas turbine type sensors, from an external source 170, such as an online database, or from inputs provided by an operator, for example. In one more specific example, if the objective 164 is to enhance efficiency of the gas turbine 200, the corresponding gas turbine parameter which is efficiency will be assigned a higher operating weightage, when compared to the remaining useful life of the component of the gas turbine 200. The values representative of the gas turbine parameters 162 may be linked to each other and upon assigning an operating weightage to efficiency, the remaining gas turbine parameters (not shown) may be assigned operating weightages automatically based on the operating weightage of the efficiency. Alternatively, the remaining gas turbine parameters (not shown) may be assigned operating weightages independently via the weightage identifier 160. In one embodiment, the weightage identifier 160 may assign at least some operating weightages to the gas turbine parameters 162 based on the inputs by the operator 170. In such an embodiment, the weightage identifier 160 may include an input device 161, where the operator manually assigns the operating weightages to the gas turbine parameters 162 based on the objective 164 via the input device.

For example, if the plant objective is to maximize economic gain from the industrial power plant 1000 and also conservation of the remaining useful life of the gas turbine 200, an optimization equation for maximizing profit may be represented as:

$$\max_{\substack{\gamma \\ t \in [t0, tf]}} \alpha(p(t)P(\gamma) - f(t)W_f(\gamma)) + \beta(RUL(t_f) - RUL_{Target})^2$$

subject to $$\text{efficiency}(\gamma) \geq \eta_{min}$$

$$P(\gamma) \geq P_{min}$$

$$RUL(t_f) \geq RUL_{min}$$

where γ is a vector of operating parameters and estimated operating parameters of the gas turbine 200 such as firing temperatures, output, and efficiency, f(t) is a predicted or known fuel price, and p(t) is a predicted or known electricity price as functions of time in a particular span of time from the current time, $W_f(\gamma)$ is a fuel flow rate of the gas turbine 200 as a function of operating parameters and estimated operating parameters, P(γ) is a power plant output, in some embodiments, may be including combined output power of the gas turbine and the bottoming cycle, efficiency(γ) of the power plant output, $\eta_{min}$ is a constraint on the minimum efficiency that must be delivered, and $P_{min}$ is a minimum power that must be delivered irrespective of an optimization result. Similarly, $RUL_{min} \geq 0$ is a minimum remaining useful life that must be left over after the current optimal action is executed. Furthermore, $t_0$ is a current time and $t_f$ is an end-time of a horizon considered for optimization (for example, one month), and $RUL(t_f)$ and $RUL_{Target}$ are remaining useful lifes at the end of the time horizon and target remaining useful life respectively.

Therefore, a first term $(p(t)P(\gamma)-f(t)W_f(\gamma))$ is profit (i.e., revenue obtained from sale of power minus cost of fuel), and a second term $(p(t)P(\gamma)-f(t)W_f(\gamma))$ is zero when the remaining useful life meets the target life, or the second term is negative if the target life is not met depending on individual cases. Therefore, if α is small with respect to β, the criterion of being close to the target life is assigned more weightage.

Continuing with the aforementioned example, in some embodiments, the operator may be authorized to assign the operating weightages to the gas turbine parameters 162 based on the objective 164 via the input device. The input device may include, in one example, a slider bar with three discrete selections "low", "medium", and "high" priority of the remaining useful life. In a situation, where the operator chooses "high" on the slider bar, the weightage identifier may set α=0 and β=1, denoting that profit is of least priority (over the horizon [$t_0$, $t_f$]) and that the remaining useful life is required to be maximized Such an approach may be taken, when fuel and electricity prices are currently low, but value of life of the gas turbine (such as parts cost and maintenance cost) is high. Such approach is advantageous in situations when an increase in power prices after a certain period of time is predicted and the gas turbine must match a peak power demand during such period.

Similarly, if the operator chooses "medium", the profit and the remaining useful life may be set to 0.5 (α=0.5 and β=0.5), denoting a balance between the profit and the remaining useful life. Such an approach appropriate, when the prices of electricity are moderate. In another alternative, if the operator chooses "high", the profit would be maximized and the remaining useful life would be assigned lowest priority, in situations, when the cost of electricity is the highest, so that revenue/profit is maximized. However, the safe limits on the remaining useful life are maintained to prevent malfunction of the gas turbine 200.

The system 100 further includes an optimizer 180 that is configured to generate a set point 182 for operating the gas turbine 200 based on the weighted gas turbine parameters 162, by solving the optimization equations as described above. The optimizer may include an executable program which may include for example, linear programming, quadratic programming, or nonlinear programming. The set point 182 is transmitted to a gas turbine controller 190, which receives the set point 182 and, if the set point 182 is different than the earlier set point, the gas turbine controller 190 adjusts an operating characteristic 112 of the gas turbine 200 to meet the set point 182. The adjustment of the operating characteristic 112 of the gas turbine 200 enables the system 100 to manage the remaining useful life of the gas turbine 200.

For ease of illustration, separate estimation, identification, and control blocks are shown in FIG. 2. These may be discrete elements/units or may be integrated as linked subroutines in one or more common processors.

Figure 3:
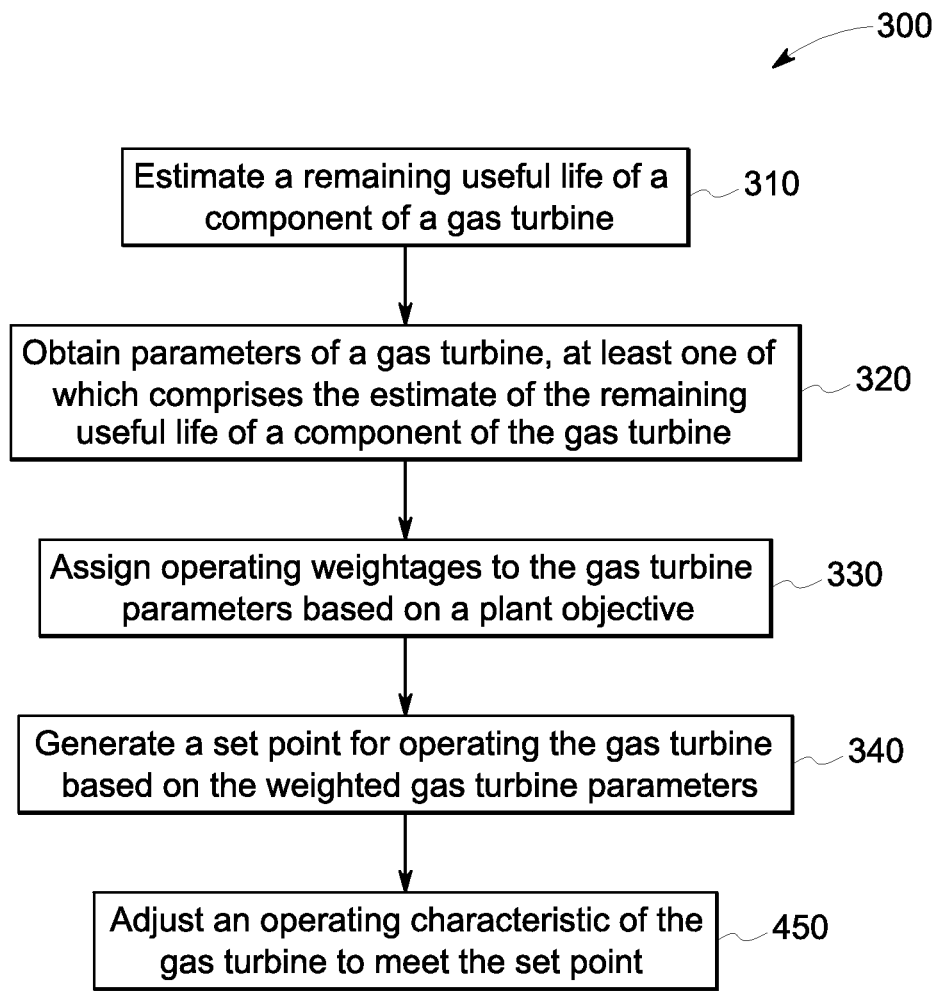
FIG. 3 is a flow chart representing steps involved in a method for managing a remaining useful life of a component of a gas turbine in accordance with one embodiment of the invention.

FIG. 3 is a flow chart representing steps involved in a method 300 for managing a remaining useful life of a gas turbine component in accordance with an embodiment of the invention. The method 300 includes obtaining parameters of a gas turbine while the turbine is operating, at least one of which represents an estimated remaining useful life of the component of the gas turbine in step 310. The estimate of the remaining useful life of the gas turbine component can be computed based on the above mentioned description with respect to life prediction module 120 of FIG. 2, for example. The method 300 also includes assigning operating weightages to the gas turbine parameters based on plant objective in step 320 in a manner such as discussed above with respect to weightage identifier 160 of FIG. 2. The method 300 further includes generating a set point for operating the gas turbine based on the weighted gas turbine parameters in step 330 as discussed above with respect to the optimizer 180 of FIG. 2. The method 300 also includes adjusting an operating characteristic of the gas turbine to meet the set point in step 340 as discussed above with respect to the gas turbine controller 190 of FIG. 2.

Figure 4:
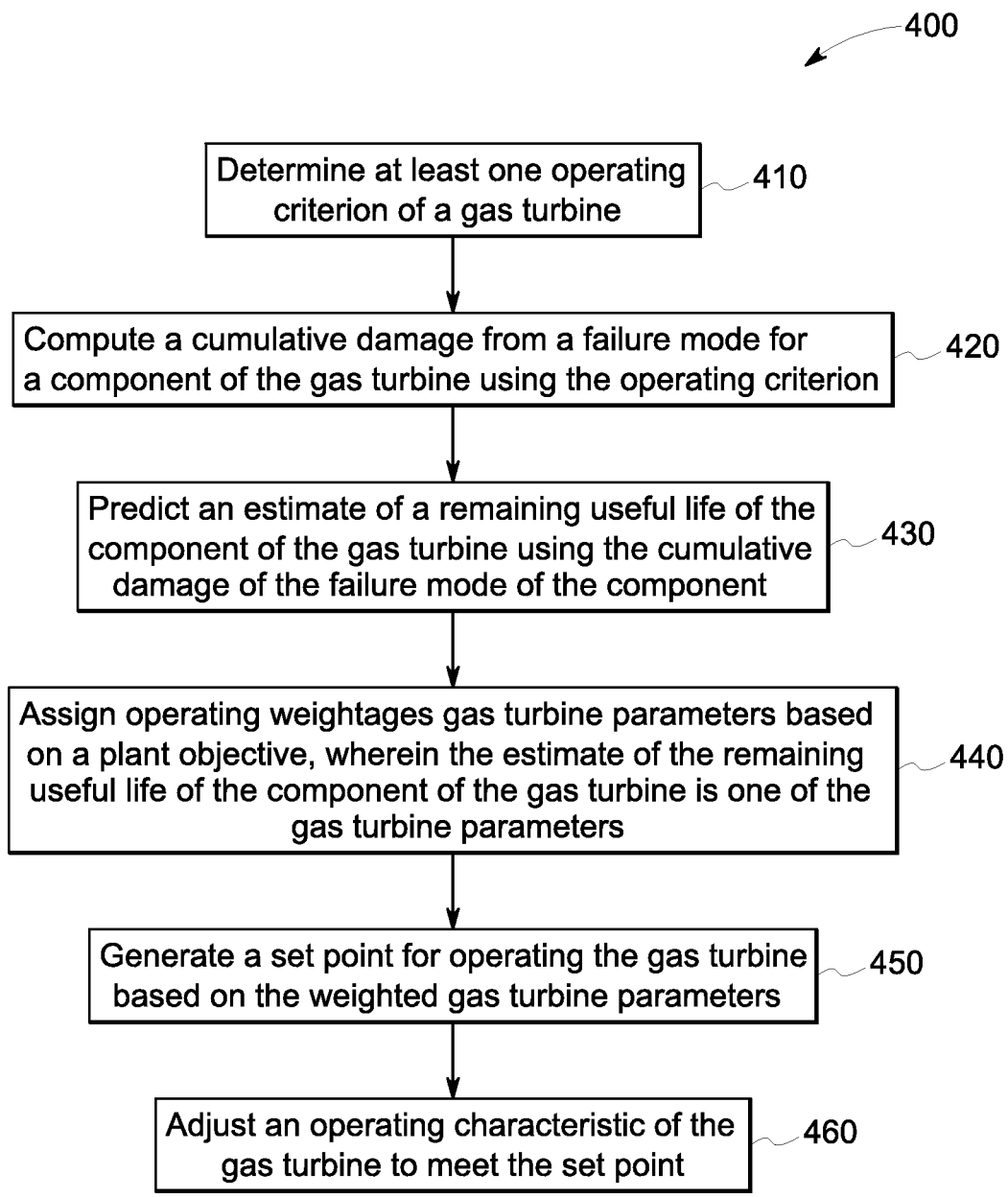
FIG. 4 is a flow chart representing steps involved in a method for predicting and managing a remaining useful life of a component of a gas turbine in accordance with another embodiment of the invention.

FIG. 4 is a flow chart representing steps involved in a method 400 for predicting and managing a remaining useful life of a component of a gas turbine in accordance with another embodiment of the invention. The method 400 includes determining an operating criterion of a gas turbine in step 410. In one embodiment, determining the operating criterion of the gas turbine includes determining the operating criterion based on the obtained operating characteristic and one or more estimated operating characteristics as discussed above with respect to criterion identifier 130 of FIG. 2. The method 400 may also include computing a cumulative damage from a failure mode for the component of the gas turbine using the operating measure in step 420 as described with respect to damage identifier 140 of FIG. 2 for example. The method 400 may further include predicting an estimate of a remaining useful life of the component of the gas turbine using the cumulative damage of a failure mode at the component, an estimated operating profile of the component into the future, and a design limit of the component in step 430 as discussed with respect to prediction unit 150 of FIG. 2, for example. The method 400 further includes steps 440, 450 and 460 which correspond to steps 320, 330, and 340 of FIG. 3, for example.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
obtaining an operating characteristic of a gas turbine using a sensor of a system of an industrial power plant;
determining, by at least one processor, an estimated operating characteristic of the gas turbine based on the operating characteristic using an estimator of the system, wherein the estimated operating characteristic is determined by the estimator using a Kalman filter that uses a mathematical model representing dynamics of the gas turbine to determine the estimated operating characteristic;
in a life prediction module of the system executable by the at least one processor;
obtaining the estimated operating characteristic and the operating characteristic;
determining, by the at least one processor, an operating criterion of the gas turbine based on the estimated operating characteristic and the operating characteristic using a criterion identifier;
transmitting, by the at least one processor, the operating criterion to a damage identifier for computing a cumulative damage from a failure mode for a component of the gas turbine using the operating criterion; and
transmitting, by the at least one processor, the cumulative damage to a prediction unit for predicting an estimate of a remaining useful life of the component of the gas turbine, the prediction unit predicting the remaining useful life of the component based upon the cumulative damage, an estimated operating profile for the component, and a design limit of the component, wherein the estimated operating profile includes a specific metal temperature and metal stress at a location in the gas turbine;
determining, by the at least one processor, an estimate of uncertainty in the estimate of the remaining useful life of the component;
transmitting, by the at least one processor, the estimate of the remaining useful life of the component and the estimate of uncertainty from the prediction unit of the life prediction module to a weightage identifier of the system for assigning operating weightages to a plurality of gas turbine parameters based upon the remaining useful life of the component and the estimate of uncertainty, wherein the estimate of the remaining useful life of the component of the gas turbine is one of the plurality of gas turbine parameters;
transmitting, by the at least one processor, the operating weightages of the plurality of gas turbine parameters from the weightage identifier to an optimizer of the system for generating a set point for operating the gas turbine based on the operating weightages of the plurality of gas turbine parameters; and
transmitting, by the at least one processor, the set point from the optimizer to a turbine controller of the system to adjust the operating characteristic of the gas turbine to meet the set point, thereby managing the remaining useful life of the gas turbine.

2. The method of claim 1, wherein the operating characteristic includes at least one of compressor inlet temperature, compressor discharge pressure, compressor discharge temperature, exhaust temperature, metal surface temperature, gas turbine power output and fuel flow rate.

3. The method of claim 1, wherein the estimated operating characteristic includes at least one of turbine inlet temperature, firing temperature, compressor inlet air flow, cooling flow temperature and flow rate of compressed air.

4. The method of claim 1, wherein the estimated operating characteristic is determined by the estimator using a Bayesian technique.

5. The method of claim 4, wherein the Bayesian technique comprises the Kalman filter recursively predicting a conditional Gaussian probability distribution function, and wherein the Kalman filter computes a Kalman gain.

6. The method of claim 1, wherein the mathematical model comprises one of a continuous time system and a discrete time system representing dynamics of the gas turbine.

7. The method of claim 1, wherein computing the cumulative damage of the failure mode for the component of the gas turbine comprises computing the cumulative damage based on a damage accumulation rate at the component as a function of the operating criterion.

8. The method of claim 1, wherein the failure mode comprises at least one of creep, fatigue crack initiation, oxidation, creep deflection, thermal barrier coating spallation and fatigue crack growth rate.

9. The method of claim 1, further comprising determining an actual damage measurement of the component of the gas turbine and combining the actual damage measurement with the cumulative damage in a damage accumulation model for predicting the estimate of the remaining useful life of the component of the gas turbine.

10. The method of claim 1, wherein a cumulative damage of an additional gas turbine is statistically combined with the cumulative damage computed by the damage identifier to adjust the cumulative damage of the component of the gas turbine.

11. The method of claim 10, wherein the cumulative damage of the additional gas turbine is statistically combined using a Bayesian technique.

12. The method of claim 1, wherein the component comprises at least one of a gas turbine compressor part, a gas turbine combustor part, a gas turbine hot gas path part, a turbine part such as a rotor, and a bottoming cycle part.

13. The method of claim 1, wherein the component comprises a gas turbine hot gas path part, and wherein the remaining useful life of the gas turbine is computed by obtaining a historical variation of ambient temperature and power output of the gas turbine hot gas path part.

14. The method of claim 13, wherein the gas turbine hot gas part includes one or more sub-components.

15. The method of claim 14, wherein the remaining useful life of the gas turbine hot gas part by the one or more sub-components is computed using a finite-element analysis (FEA) model.

16. The method of claim 1, wherein the remaining useful life of the component is based on at least one of an estimated maintenance cost of the component and an estimated scrap cost of the component.

17. The method of claim 1, wherein a mean and standard deviation of at least one of a creep strain, a fatigue crack initiation damage, an oxidation depth, a thermal barrier coating spallation, and a fatigue crack length is computed to determine the estimate of the remaining useful life of the component.

* * * * *